United States Patent [19]

Yeh

[11] Patent Number: 4,644,106
[45] Date of Patent: Feb. 17, 1987

[54] APPARATUS FOR TIMELY CONTROLLING THE SOUND CHARACTERISTIC OF A SIGNALING MEANS OF A VOICE COMMUNICATION DEVICE

[75] Inventor: Kou-I Yeh, Taipei, Taiwan

[73] Assignee: Inventa electronics Co., Ltd., Taipei, Taiwan

[21] Appl. No.: 690,720

[22] Filed: Jan. 10, 1985

[51] Int. Cl.$^4$ .............................................. H04M 1/21
[52] U.S. Cl. .............................. 379/375; 340/309.15; 379/387
[58] Field of Search ................. 179/81 R, 84 C, 84 T, 179/84 R; 340/329, 328, 348 E, 309.15, 309.4; 455/231, 181; 331/182, 183

[56] References Cited

U.S. PATENT DOCUMENTS

| | | | |
|---|---|---|---|
| 4,046,972 | 9/1977 | Huizinga et al. | 179/99 |
| 4,409,439 | 10/1983 | Gamble | 179/84 C |
| 4,480,154 | 10/1984 | Klee | 179/84 C |
| 4,521,843 | 6/1985 | Pezzolo et al. | 364/145 |

Primary Examiner—Thomas W. Brown
Assistant Examiner—R. Vaas
Attorney, Agent, or Firm—Townsend and Townsend

[57] ABSTRACT

An automatic telephone silencer and volume controller having a microprocessor for storing time and volume information and for timely controlling the sound characteristics of a telephone ringer in accordance with the time and volume information stored. The time and volume information may be entered into the microprocessor by a suitable keyboard. Each time entry has associated with it a volume entry so that the telephone will ring at the prescribed volume from that time until the time denoted by the next time entry.

10 Claims, 5 Drawing Figures

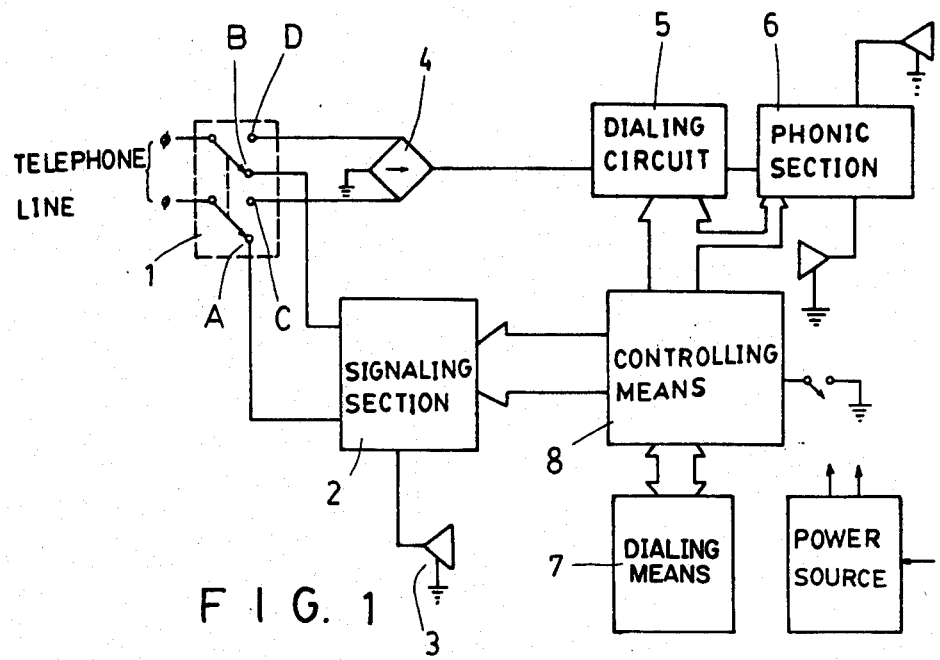
F I G. 1
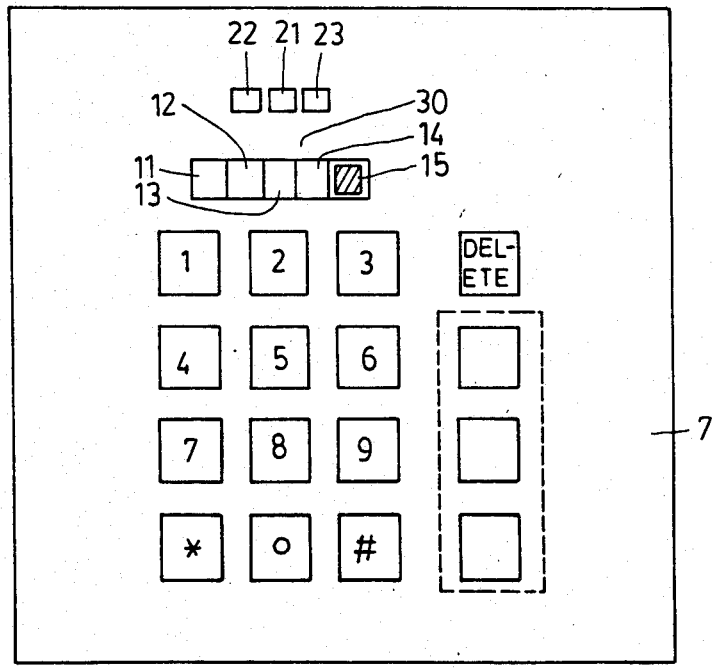
F I G. 2

|  | PM/AM | HOUR | MINUTE | VOLUME |
|---|---|---|---|---|
| STANDARD TIME | 1 | 03 | 15 | ✕ |
| FIRST PREDETERMINED TIME | 0 | 12 | 00 | 11 |
| SECOND PREDETERMINED TIME | 0 | 06 | 30 | 01 |
| THIRD PREDETERMINED TIME | 1 | 08 | 00 | 10 |
| FOURTH PREDETERMINED TIME | 1 | 11 | 00 | 11 |
F I G. 4
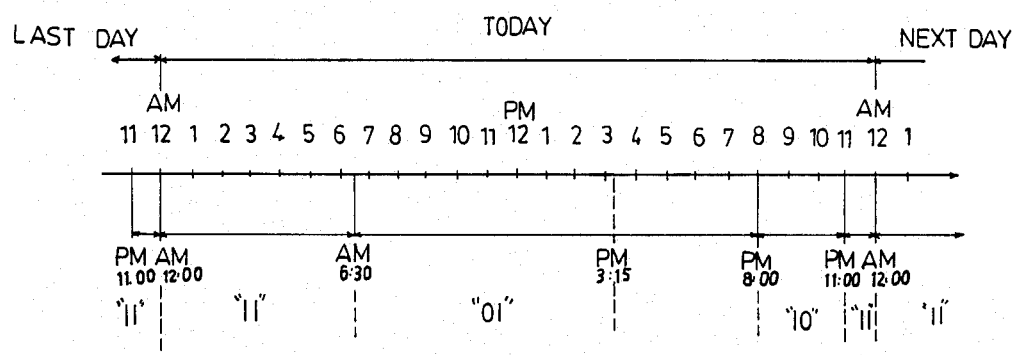
F I G. 5

APPARATUS FOR TIMELY CONTROLLING THE SOUND CHARACTERISTIC OF A SIGNALING MEANS OF A VOICE COMMUNICATION DEVICE

BACKGROUND OF THE INVENTION

The present invention is related to an apparatus for timely controlling the sound characteristic of a signaling means of a voice communication device, and more particularly to an apparatus for timely controlling the sound volume of a signaling means of a telephone. It should be noted that the term of "sound characteristic", in here, includes the sound volume, the sound frequency, tone, and the other sound properties.

In general, the conventional telephone signaling means for notifying the subscribers that they are wanted at the telephone is the mechanical bell or the electronic tone ringer. There are several types of the telephone signaling means being adjustable in volume or tone, this function is always achieved by a mechanical or electrical switch, a continuous adjuster, or a discontinuous adjuster. Since these switches or adjusters are the manual operation type, the user has to adjust the switch or the adjuster, when he desires to change the sound volume of the telephone signaling means.

Aparently, such an adjuster provides the user the advantage of controlling the sound volume of the telephone signaling means at any time, as he desires. For example, in daytime, the signaling means can be adjusted to produce louder signaling sound; in the evening, adjusted to lower the signaling sound; and even at bedtime, the signaling means can be turned off for preventing one from suddenly awakening due to the disturbance of the rasping signaling sound. The above-described adjustment shall be done at proper time by the user. However, many times, the user forgets to adjust the signaling means into its proper state, thus causing himself or others much inconvenience. For example, the user turned off the signaling means before he went to bed, but forgot to turn it on the next morning, and thus, any incoming telephones will be missed. In another case, the user forgets to turn off the signaling means before he goes to bed, therefore any telephone calls in the middle of the night will interrupt his sleep. In addition to the telephone, any intercommunication device which has a signaling means will be subject to the same conditions described above, the above-described conditions also exist. Thus, the apparatus which is capable of timely, automatically controlling the sound volume of the signaling means of a voice communication device is desired. It should be noted that in this application, the term "voice communication device" intends to include the telephone, interphone, intercommunication device, and other like devices.

A timely controlling apparatus according to one preferred embodiment of the present invention intends to improve on the above-described inconveniences.

SUMMARY OF THE INVENTION

One object of the present invention is to provide an apparatus for timely controlling the sound characteristic of a signaling means of a voice communication device, which is provided within the telephone set. The time and sound characteristic states can be preset and stored in the timely controlling apparatus. Then, according to these stored time and sound characteristic states, the apparatus can control the signaling means to produce the signaling sound with the respective characteristic at the respective preset time.

In accordance with the present invention, an apparatus for timely controlling the sound characteristic of a signaling means of a voice communication device which has an input section, comprises a signaling circuit coupled to the input section and the signaling means respectively; a setting means capable of manually generating at least two sets of time setting signals and sound characteristic setting signals; a controlling circuit coupled to the signaling means and the setting means respectively, the controlling circuit capable of receiving and storing the time setting signals and sound characteristic setting signals from the setting means, so that when a calling signal is transmitted to the signaling circuit throught the input section, the controlling circuit controlling the signaling circuit actuates the signaling means to produce a signaling sound which sound characteristic is determined by the time setting signals and sound characteristic setting signals stored in the controlling circuit.

BRIEF DESCRIPTION OF THE DRAWINGS

The present invention will be more fully understood from the following detailed description, taken in connection with the accompanying drawings which form an integral part of this application and in which:

FIG. 1 is a block diagram of a timely controlling apparatus connected with the network of a telephone set, according to one preferred embodiment of the present invention;

FIG. 2 is a plan view of a push-button dialing panel of the present invention;

FIG. 4 is a setting chart showing one example of several sets of the preset times and sound characteristics; and FIG. 5 is a schematic time diagram showing time vs. sound volume states corresponding to the setting chart of FIG. 4.

DETAILED DESCRIPTION OF THE PREFERRED EMBODIMENT

Figure 3:
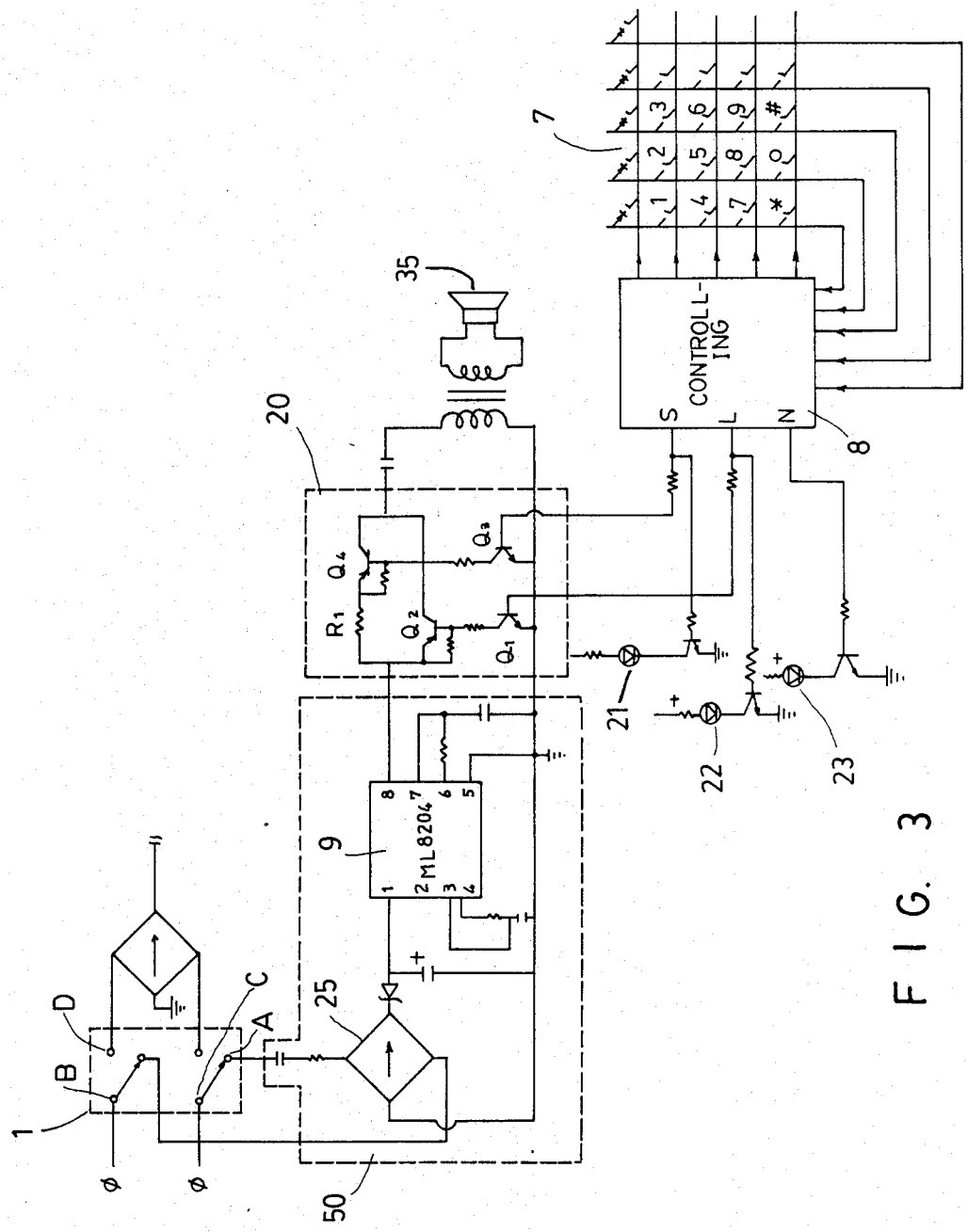
FIG. 3 is a schematic electrical diagram of the timely controlling apparatus.

Referring now to the drawings, it should be noted that a like member is designated with a like reference number. FIG. 1 shows a block diagram of a timely controlling apparatus connected with the network of a telephone set. When the handset of the telephone is resting in its cradle, a hook switch 1 is connected to two contacts A and B. In this state, an incoming call will make a call signal transmitted to a signaling section 2, and then drive a speaker 3 to notify subscribers that they are wanted at the telephone. When the subscriber picks up the handset, the hook switch 1 is then connected to another two contacts C and D. Therefore, the subscriber can communicate with the caller through the telephone line, the hook switch 1, a bridge rectifier 4, a dialing circuit 5, and a phonic section 6. In making a telephone call, the caller picks up the handset, and dials the desired number on a dialing means 7. Then, a controlling means 8 will deal with the call, and shuttle the caller communicating with who he wants to call through the phonic section 6, the dialing circuit 5, the bridge rectifier 4, the hook switch 1, and the telephone line.

The dialing means 7 of this embodiment is push-button dialing means which has a plurality of numeral buttons and function buttons, as shown in FIG. 2. In the present invention, the push-button dialing means 7 has not only the normal dialing function, but also the functions of inputting several sets of the time setting signals and the sound characteristic setting signals to the controlling means 8. It should be noted that means for setting the time setting signals and the sound characteristic signals can be separated from the push-button dialing means 7, but are preferably combined together. However, the term of "setting means" will be used to replace the term of push-button dialing means hereinafter for properly representing the present invention. The controlling means 8, in this embodiment, is a single chip microcomputer having a random access memory (RAM), is capable of receiving the sets of the setting signals from the setting means 7, and storing all of them in the RAM. One example of the controlling means 8 is an integrated circuit of TMT47C22F manufactured by the TOSHIBA CO., Japan. According to these stored signals, the controlling means 8 can control the signaling section 2 and the speaker 3 to produce the signaling sound with the respective sound characteristic at the respective time, the details of which will be further described below.

Referring now to FIG. 4, in the timely controlling apparatus of the present invention, a standard time set and four predetermined time sets can be stored in the RAM of the controlling means 8 from the setting means 7. The standard time set includes three datas: PM/AM, Hour, and Minute, and each predetermined time set includes four datas: three above-mentioned datas as the standard time set, and Volume. The forms of the Hour and Minute datas are two digits presenting as general use. The form of the PM/AM data is one digit, "0" indicates the A.M., and "1" indicates the P.M. The form of the Volume data is two digits, "01" indicates the signaling sound being made louder, "10" indicates the signaling sound being lowered, "11" indicates the signaling sound being silenced. The standard time is used to represent the time at which the user is operating the setting process, in other words, the standard time is used as the basis for the controlling means to count the time. The predetermined time sets are used to make the controlling means change the sound characteristic at the proper predetermined time.

In the setting process, the function button "*" is first pushed by the user to denote that he is beginning to set the time and the sound characteristic state, and then a digit from 0 to 4 is selected and keyed in for denoting that the input is the standard time set ("0") or the first to fourth predetermined time sets ( respective "1 to 4"). After all the desired datas of the standard time set or the predetermined time sets are keyed in, sequentially, the function button "#" is pushed to denote that the setting process has ended. Two examples of the sequences of the key-in are shown as following:

(a). The input of the standard time set:

"*"; "0"; "1"; "03"; "15"; "#".

(b). The input of the second predetermined time set: "*"; "2"; "0"; "06"; "30"; "01"; "#".

Moreover, a function button "delete", as shown in FIG. 2, is provided for deleting the stored time set, and one example of the deleting process is shown as following:

(c). "*"; "4"; "delete"; "#".

The above example is that the fourth predetermined time set is deleted. It should be noted that the way of setting and deleting time of the present invention is not limited to the above-described forms, for other modified forms can be easily performed by those who are ordinarily skilled in the art.

For detailed understanding, FIG. 5 shows the time states vs. the sound characteristic states in accordance with the predetermined time sets as shown in FIG. 4. The signaling sound is silenced from A.M. 12:00 to A.M. 6:30. The signaling sound is made to louder from A.M. 6:30 to P.M. 8:00, and is lowered from P.M. 8:00 to P.M. 11:00. From P.M. 11:00 to A.M. 12:00, the signaling sound is silenced again. In this embodiment, normally, the A.M. 12:00 represents midnight, and the P.M. 12:00 represents noon.

Referring now to FIG. 3, which shows the timely controlling apparatus of the present invention including the setting means 7, the controlling means 8, an input section 50, three indicating lamps 21, 22, 23 (also shown in FIG. 2), a signaling circuit 20, and a signaling means 35, preferably a speaker. The input section 50 includes an electronic dual tone ringer 9, and a bridge rectifier 25. In this embodiment, the electronic dual tone ringer 9 is an integrated circuit of ML8204 manufactured by MITEL Semiconductor Inc., Canada. Since the electronic dual tone ringer 9 is commonly known, and is not the feature of the present invention, further description is unnecessary. The controlling means 8 has three output ports S, L, N as designated in FIG. 3. When the abovementioned Volume state is in the "10" state, the output port S is in the ON state and the other output ports in the OFF state, and thus the indicating lamp 21 is turned on. If any incoming telephone calls are made during this time, a call signal will transmitted to the signaling circuit 20 through the hook switch 1, and the input section 50. In this case, the transistors Q3 and Q4 of the signaling circuit 20 are turned on, whereby the call signal flows through a resistor R1 and the transistor Q4 to actuate the signaling means 35. Since the resistor R1 attenuates the call signal, the signaling sound generated from the signaling means 35 is lowered. The degree of the attenuation is dependent on the magnitude of the resistance of the resistor R1.

Similarly, when the volume state is in the "01" state, the output port L is in the ON state and the other output ports in the OFF state, and thus the indicating lamp 22 is turn on. If any incoming telephone calls are made during this time, the transistors Q1 and Q2 will be turned on, whereby the call signal flows through the transistor Q2 to the signaling means 35. In this case, since the call signal is not attenuated by the signaling circuit 20, the signaling sound is louder than in the previous case. When the Volume state is in the "11" state, the output port N is in the ON state and the other output ports in the OFF state, and thus the indicating lamp 23 is turn on. In this case, the transistors Q1 to Q4 are all turned off, and thus it is impossible for the call signal to reach the signaling means 35 to generate a signaling sound.

Referring back to FIG. 2, the present invention may be further provided with a selective switch 30 on the push-button dialing panel. In such a case, before setting the preset time and the sound characteristic state, the selective switch 30 must be switched to the setting position 11, and then the datas inputted according to the above-described method. Upon completing the setting process, the selective switch 30 is switched to the "auto" position 15 for putting the apparatus in an automatic, time controlled state. Moreover, another three positions 12, 13, and 14 respectively represent the position of forcing the controlling means to increase the volume of the signaling sound, the position to lower the volume of the signaling sound, and the position to silence the signaling sound, in spite of the current state of the predetermined time and the sound characteristic. Therefore, the present invention is made more convenient and adjustable than the conventional device.

It should be understood that the above-mentioned predetermined time sets are not limited to four sets, but must have at least two sets. If the telephone set has a clock, the standard time set utilized as the basis for the controlling means 8 to count the time can be removed. Although, in the present invention, the controlling means 8 controls the signaling circuit 20 to change the sound volume of the signaling means 35, it should be noted that those who are ordinarily skilled in the art can easily modify the signaling circuit to change the sound intensity, tone, sound frequency, etc., of the signaling means 35. Thus, the term "sound characteristic" should receive the broadest interpretation.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modification and equivalent structures.

What I claim is:

1. An apparatus for timely controlling a sound characteristic of a signaling means of a voice communication device having an input section comprising:
    a signaling circuit coupled to said input section and said signaling means;
    a setting means capable of generating at least two sets of time setting signals and sound characteristic setting signals;
    a controlling means coupled to said setting means and said signaling circuit for receiving and storing said sets of time setting signals and sound characteristic setting signals from said setting means, so that when a calling signal is transmitted to said signaling circuit through said input section, said controlling means actuates said signaling means to produce a signaling sound having a desired sound characteristic, the desired sound characteristic of the signaling sound being predetermined by said sets of time setting signals and sound characteristic setting signals stored in said controlling means;
    wherein said signaling circuit comprises at least two sets of switching circuits coupled to said input section, said controlling means, and said signaling means, said controlling means respectively controlling said switching circuits and turning one of said switching circuits on in accordance with said stored sets of time and sound characteristic setting signals, each of said switching circuits being connected with a respectively different resistance for attenuating said calling signal from said input section in different degrees, so that said signaling means will be actuated by an attenuated signal from said turned-on switching circuit to produce a signaling sound having the desired sound characteristic.

2. The apparatus as claimed in claim 1, wherein each switching circuit comprises a first transistor having a base, a collector and an emitter, the base and emitter being respectively coupled to said controlling means and to ground, and a second transistor having a base, a collector and an emitter, the emitter, base, and collector of the second transistor being respectively coupled to said input section through a resistor, to the collector of said first transistor, and to said signaling means.

3. The apparatus as claimed in claim 2, wherein said setting means can further generate a standard time set, and said controlling means is capable of receiving and storing said standard time set as a basis for it to count the time.

4. The apparatus as claimed in claim 3, wherein said controlling means is a single chip microcomputer.

5. The apparatus as claimed in claim 4, wherein said setting means includes a push-button means which has a plurality of numeral buttons and function buttons.

6. The apparatus as claimed in claim 5, further comprising a visual indicator connected to said controlling means for indicating a current state of the sound characteristic.

7. The apparatus as claimed in claim 6, wherein said voice communication device is a telephone.

8. The apparatus as claimed in claim 7, wherein the sound characteristic is sound volume.

9. The apparatus as claimed in claim 8, wherein said input section includes a bridge rectifier connected to the telephone line via the hook switch of said telephone, and an electronic dual tone ringer coupled to said bridge rectifier.

10. The apparatus as claimed in claim 9, wherein said setting means has a deleting push-button coupled to said controlling means for deleting the stored standard time set, or the stored sets of time and sound characteristic setting signals.

* * * * *